United States Patent [19]

Kurisu et al.

[11] Patent Number: 4,486,527

[45] Date of Patent: Dec. 4, 1984

[54] THERMO-DEVELOPABLE TYPE DIAZO COPYING MATERIAL WITH 2-NAPHTHOL COUPLER HAVING LONG ALIPHATIC CHAIN AMIDE SUBSTITUTION

[75] Inventors: Norio Kurisu, Numazu; Tsutomu Matsuda; Masaru Shimada, both of Shizuoka; Keishi Kubo, Yokohama, all of Japan

[73] Assignee: Ricoh Co., Ltd., Tokyo, Japan

[21] Appl. No.: 466,279

[22] Filed: Feb. 14, 1983

[30] Foreign Application Priority Data

Feb. 19, 1982 [JP] Japan .................................. 57-25741

[51] Int. Cl.[3] ......................... G03C 1/58; G03C 1/60; G01D 15/10

[52] U.S. Cl. .................................... 430/158; 430/159; 430/160; 430/162; 430/180; 430/151; 430/346; 430/348; 430/541; 250/316.1; 250/317.1; 346/76 PH; 346/135.1

[58] Field of Search ............... 430/151, 162, 158, 160, 430/180, 346, 541, 159, 348; 250/316.1, 317.1; 346/76 PH, 135.1

[56] References Cited

U.S. PATENT DOCUMENTS

| | | | |
|---|---|---|---|
| 3,301,679 | 1/1967 | Halperin et al. | 430/162 |
| 3,367,776 | 2/1968 | Bialczak et al. | 430/180 |
| 3,565,629 | 2/1971 | Usbeck et al. | 430/173 |
| 3,642,483 | 2/1972 | Kubo et al. | 430/178 |
| 4,387,150 | 6/1983 | Yabuta et al. | 430/151 |
| 4,400,456 | 8/1983 | Matsuda et al. | 430/151 |

FOREIGN PATENT DOCUMENTS 50-105130 8/1975 Japan .

*Primary Examiner*—Charles L. Bowers, Jr.

*Attorney, Agent, or Firm*—Flynn, Thiel, Boutell & Tanis

[57] ABSTRACT

A thermo-developable type diazo copying material including a substrate and a heat sensitive recording layer, superposed on said substrate, which consists essentially of a diazo compound, a coupler and a heat-fusible color assistant, characterized in that said heat sensitive recording layer is of the multilayered type comprising a diazo compound-containing layer and a coupler-containing layer, and said coupler is composed of one or two or more of the compounds having the following general formula:

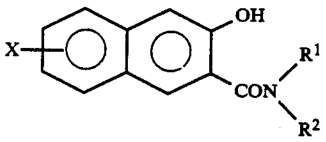

wherein X is hydrogen, halogen, an alkyl group having 1–4 carbon atoms or an alkoxyl group having 1–4 carbon atoms; $R^1$ is an alkyl group having 10–25 carbon atoms; and $R^2$ is hydrogen or an alkyl group having 1–30 carbon atoms.

19 Claims, No Drawings

THERMO-DEVELOPABLE TYPE DIAZO COPYING MATERIAL WITH 2-NAPHTHOL COUPLER HAVING LONG ALIPHATIC CHAIN AMIDE SUBSTITUTION

BACKGROUND OF THE INVENTION (a) Field of the Invention

The present invention relates to a thermo-developable type diazo copying material, in particular relates to a fixable diazo system heat-sensitive recording material.

(b) Description of the Prior Art

Thermo-developable type diazo copying materials are well known wherein the reaction of a diazo compound with a coupler is designed to be effected by heating. However, any one of the conventional thermo-developable type diazo copying materials, when viewed from the practical aspect, is not satisfactory in the points of raw preservability (preservability of the copying materials per se before use) and thermo-color formability.

Due to this, in the preparation of thermo-developable type diazo copying materials there have been proposed for instance (1) to isolate active components (diazo compound and coupler) by an intermediate layer as disclosed in British Pat. No. 815005 and to pulverize one of the active components into fine particles and encapsulate said fine particles with a continuous, non-permeable shell as disclosed in U.S. Pat. No. 3,111,407, and (2) to add, as color assistants, heat-fusible substances such as paraffin and the like having a melting point of 45°-150° C. as disclosed in Japanese Patent Publication No. 839/1969 for the purpose of obtaining the products of high color formability. However, the above mentioned method (1) is defective in that the heat sensitivity is apt to deteriorate, and the above mentioned method (2) is defective in that the raw preservability deteriorates. As seen from the aforegoing, the fact is that it is impossible at the present time to find thermo-developable type diazo copying materials which can satisfy the requirements of raw preservability and heat sensitivity (low temperature development) at the same time.

SUMMARY OF THE INVENTION

It is an object of the present invention to provide a thermo-developable type diazo copying material that has solved the aforesaid defects completely. It is another object of the present invention to provide a thermo-developable type diazo copying material that is superior in both the high speed recording ability and the heat responsiveness to a thermal head and so can be utilized as output recording materials for facsimile, telex, electronic calculators, medical measuring machines and the like.

That is, the thermo-developable type diazo copying material according to the present invention is characterized in that it includes a substrate and a two-component system heat sensitive recording layer, superposed on said substrate, which has a two-layer structure comprising a first layer consisting essentially of a diazo compound or a coupler and a second layer, superposed on said first layer, consisting essentially of a coupler or a diazo compound; at least either of said first and second layers contains a heat-fusible color assistant which is hardly soluble or insoluble in water and has a melting point of 50°-150° C.; and said coupler is composed of one or two or more of compounds having the following general formula:

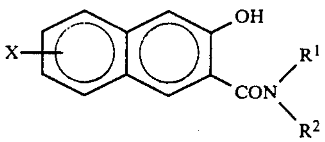

(wherein, X is hydrogen, halogen, an alkyl group having 1-4 carbon atoms or an alkoxy group having 1-4 carbon atoms; $R^1$ is an alkyl group having 10-25 carbon atoms; and $R^2$ is hydrogen or an alkyl group having 1-30 carbon atoms).

DETAILED DESCRIPTION OF THE PREFERRED EMBODIMENTS

The present invention will be detailed hereafter. As mentioned above, the thermo-developable type diazo copying material according to the present invention is basically prepared by superimposing a heat-sensitive recording layer on a substrate (paper, synthetic paper, resin film, metal laminate paper or the like), said heat-sensitive recording layer being formed of a diazo compound, a coupler and a heat-fusible color assistant which is hardly soluble or insoluble in water and has a melting point of 50°-150° C. The heat-sensitive recording layer is designed to have a multi-layer (two-layer) structure wherein the lower layer (the first layer, namely, the layer on the substrate side) is formed of a diazo compound (or a coupler)-containing layer, the upper layer (the second layer, namely, the layer on the surface side) is formed of a coupler (or a diazo compound)-containing layer, and further said color assistant is added to either or both of the first and second layers.

As the diazo compound used in the present invention, there can be applied light-sensitive diazonium compounds—used hitherto in the field of two-component type diazo copying materials.

In more detail, accordingly, the diazo compounds used suitably in the present invention include, for instance, double salts that are composed of metal chlorides (zinc chloride, cadmium chloride, tin chloride and the like) and compounds such as 4-diazo-1-dimethylaminobenzene, 4-diazo-1-diethylaminobenzene, 4-diazo-1-dipropylaminobenzene, 4-diazo-1-methylbenzylaminobenzene, 4-diazo-1-dibenzylaminobenzene, 4-diazo-1-ethylhydroxyethylaminobenzene, 4-diazo-1-diethylamino-3-methoxybenzene, 4-diazo-1-dimethylamino-2-methylbenzene, 4-diazo-1-benzoylamino-2,5-diethoxybenzene, 4-diazo-1-morpholinobenzene, 4-diazo-1-morpholino-2,5-diethoxybenzene, 4-diazo-1-morpholino-2,5-dibutoxybenzene, 4-diazo-1-anilinobenzene, 4-diazo-1-dimethylamino-3-carboxybenzene, 4-diazo-1-toluylmercapto-2,5-diethoxybenzene, 4-diazo-1,4-methoxybenzoylamino-2,5-diethoxybenzene and the like; salts of strong acids such as sulfuric acid, tetrafluoroborate, hexafluorophosphoric acid and the like of said compounds; and the like. However, the diazo compounds used in the present invention are not restricted to the foregoing compounds alone. These diazo compounds may be used singularly or in combination of two or more concurrently.

The couplers used in the present invention are the compounds having the aforesaid general formula. These couplers include 2-hydroxynaphthoic acid decyl amide, 2-hydroxynaphthoic acid dodecyl amide, 2-hydroxynaphthoic acid octadecyl amide, 2-hydroxynaphthoic acid heptadecyl amide, 2-hydroxynaphthoic acid didodecyl amide, 6-bromo-2-hydroxynaphthoic acid octadecyl amide, 6-methyl-2-hydroxynaphthoic acid decyl amide, 6-ethyl-2-hydroxynaphthoic acid dodecyl amide, 6-methoxy-2-hydroxynaphthoic acid octadecyl amide and the like. However, the couplers used in the present invention should not be restricted to these alone.

The color assistant that is used in the present invention for the purpose of improving the heat sensitivity is a heat-fusible substance having a melting point of 50°-150° C. As the heat-fusible color assistant referred to herein, there can be optionally employed any one which, when melted at said temperature, can dissolve the diazo compound and/or the coupler well.

For instance, the following can be preferably used in the present invention.

(1) Fatty acid amides having the general formula A-1:

$$R^3CONH_2 \qquad \text{(A-1)}$$

(wherein, $R^3$ is a saturated or unsaturated alkyl group having 5-24 carbon atoms.). As said fatty acid amides, there can be enumerated the following ones: caproic acid amide, caprylic acid amide, capric acid amide, lauric acid amide, myristic acid amide, palmitic acid amide, stearic acid amide, behenic acid amide, palmitoleic acid amide, oleic acid amide, eicosenoic acid amide, erucic acid amide, elaidic acid amide, linolic acid amide, linoleic acid amide, ricinoleic acid amide and the like.

(2) N-substituted fatty acid amides having the general formulas A-2 or A-2':

$$R^4CONHR^5 \qquad \text{(A-2)}$$

or $$R^6NHCOR^7 \qquad \text{(A-2')}$$

(wherein $R^4$ and $R^6$ are each a saturated or unsaturated alkyl group having 5-24 carbon atoms, and $R^5$ and $R^7$ are each an alkyl group having 1-5 carbon atoms, a substituted or unsubstituted phenyl group or a substituted or unsubstituted cyclohexyl group). Said fatty acid amides include, for instance, the following ones.

That is, as the concrete examples of the fatty acid amides having the general formulas A-2 there can be enumerated the following ones: N-methylpalmitic acid amide, N-methylstearic acid amide, N-propylstearic acid amide, N-butylstearic acid amide, stearic acid anilide, N-methylbehenic acid amide, N-ethylbehenic acid amide, N-butylbehenic acid amide, behenic acid anilide, N-methyloleic acid amide, linolic acid anilide, N-ethylcapric acid amide, N-butyllauric acid amide, capric acid-o-methoxyanilide, N-hexylstearic acid amide and the like.

As the concrete examples of the fatty acid amides having the general formula A-2' there can be enumerated the following ones: N-octadecylacetamide, N-octadecylbutylamide, N-octadecylpropionamide, N-oleylacetamide, N-oleylbenzamide, N-laurylbutylamide, N-laurylbenzamide, N-behenylacetamide, N-behenylpropionamide, N-behenylbenzamide, N-myristylbenzamide, N-stearylbenzamide, N-stearylacetamide, N-stearylcyclohexylamide, N-stearyl-o-chlorobenzamide, N-palmitylbenzamide, N-palmitylacetamide and the like.

(3) Benzamide derivatives having the general formula A-3:

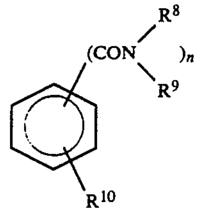

(A-3)

(wherein, $R^8$ and $R^9$ are each a hydrogen atom or an alkyl group having 1-5 carbon atoms; $R^{10}$ is a hydrogen atom or an alkyl or alkenyl group having 1-5 carbon atoms; and n is 1 or 2). These benzamide derivatives include for instance the following ones: benzamide, N,N-dimethyl benzamide, N,N-dibutyl benzamide, N,N-methyl-ethyl benzamide, 4-methyl benzamide, 4-butyl benzamide and the like.

The above compounds used as color assistants are each heat-fusible and hardly soluble or insoluble in water, and are used in the form of fine particles having a particle diameter of 0.1-10μ. The property of being "hardly soluble or insoluble in water" used herein means the case where the solubility in water (20° C.) is 5% by weight or less. This color assistant may be used singularly or in combination of two or more, and is used in the percentage of 0.1-100 parts by weight, preferably 1-50 parts by weight per part by weight of the diazo compound.

The present invention permits addition of proper amounts of various additives, used in conventional diazo copying materials, in addition to the above mentioned components. As those additives there can be enumerated for instance thermal alkali generating substances such as urea, thiourea and their derivatives, alkali salt of trichloroacetic acid, ammonium chloride, ammonium sulfate, guanidine sulfate, ammonium citrate, sodium benzoate, imidazole, their derivatives and the like; preservability improvers such as sodium naphthalenemonosulfonate, sodium naphthalenedisulfonate, sodium naphthalenetrisulfonate, sulfosalicylic acid, cadmium sulfate, magnesium sulfate, cadmium chloride, zinc chloride and the like; antioxidants such as thiourea, urea and the like; solubilizers such as caffein, theophyline and the like; acid stabilizers such as citric acid, tartaric acid, sulfuric acid, oxalic acid, boric acid, phosphoric acid, pyrophosphoric acid and the like; and additionally a small amount of saponin may be added.

Still further, the present invention can use high molecular substances such as starch, casein, poly (vinyl acetate), polyvinyl alcohol, polyacrylic acid derivatives and the like. In addition, it is preferable that inorganic or organic fine particles of silica, starch, clay, resin and the like should be added to the heat-sensitive recording layer in proper amounts as image density improvers.

The actual preparation of the thermo-developable type diazo copying material according to the present invention is carried out by firstly applying a solution or a dispersion onto a substrate in a usual manner, namely, using a wire bar or the like, said solution or dispersion being prepared by dissolving or dispersing the above specified coupler (or diazo compound), binder and other additives in a proper solvent (water, an aqueous solvent obtained by dissolving an organic solvent in water, or a non-polar or polar organic solvent of benzene, toluene, xylene, n-hexane, n-heptane, cyclohexane, kerosene, methylisobutyl ketone, methyl cellosolve, acetone, methyl ethyl ketone, dimethyl ether, siloxane or the like); drying thereby to form a first layer having a solid adhesion amount of 0.2–15 g/m$^2$; further applying, thereon, a solution or dispersion prepared by dissolving or dispersing the diazo compound (or the above specified coupler), the binder and other additives in the solvent as mentioned above, in a usual manner, namely, using a wire bar or the like; and drying thereby to form a second layer having a solid adhesion amount of 0.2–15 g/m$^2$. Thus, there may be prepared a multi-layer type heat-sensitive recording layer comprising the above mentioned first and second layers.

In this instance, attention should be paid to the following fact. That is, although the heat-fusible color assistant is added to the first layer and/or the second layer during the preparation process, it is preferably that said assistant should be added to both of the first and second layers because this acts to improve the raw preservability as well as the heat sensitivity of the copying material. The suitable ratio (by weight) of the diazo compound to the coupler is 1:0.5–20.

There are two methods to form an image on the thus obtained thermo-developable type diazo copying material. One comprises subjecting this thermo-developable type diazo copying material to imagewise exposure through an original using a fluorescent lamp or a mercury lamp and thereafter heating the same to a temperature of about 50°–150° C., preferably 90°–130° C. using infrared ray, heat roller, high frequency or the like as seen in the conventional diazo copying materials, and the other comprises heating said thermo-developable type diazo copying material imagewise to the above mentioned temperature by means of a heat pen, a heat head or the like or subjecting it to exposure as well as heating by means of infrared ray as done with conventional diazo copying materials. In both methods, the thus treated thermo-developable type diazo copying material is thereafter exposed to overall ultraviolet ray radiation using a fluorescent lamp or a mercury lamp thereby to decompose the diazo compound remaining still unreacted in the non-image area and fix it as done with conventional diazo copying materials.

The thermo-developable type diazo copying material according to the present invention has the advantages that the raw preservability can be improved exceedingly and additionally low temperature development can be effected with good results. Although the reason why such effects are brought about has not be investigated minutely yet, it is considered that as the active components, namely the diazo compound and the coupler, have been isolated from each other by an intermediate layer, the raw preservability is more improved, and that the use of the specific compound having the above mentioned general formula as the coupler acts to more lower the melting point of the heat-fusible substance for improving the heat sensitivity of the said diazo copying material according to the present invention.

In this connection, it is noted that Japanese Laid Open Patent Application No. 105130/1975 Specification discloses that the coupler having the general formula:

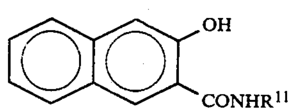

(wherein, $R^{11}$ is an alkyl group having 5–20 carbon atoms) is used for the purpose of improving the surface activity of the two-component type diazo copying material. However, this copying material is different from that of the present invention in that the recording layer is the one of the mono-layer type and further the coupler used herein is different in the length of the alkyl group from the coupler according to the present invention.

EXAMPLES

| | |
|---|---|
| 2-hydroxynaphthoic acid octadecylamide | 5 g |
| Polystyrene (50% aqueous dispersion) | 10 g |
| Stearic acid amide | 5 g |
| Water | 100 ml |

A mixture having the above composition was dispersed by means of a homogenizer. The resulting dispersion was applied onto the surface of a diazo copying base paper (substrate) by means of a wire bar and dried to thereby form a coupler layer (a first layer) having a solid adhesion amount of about 3 g/m$^2$. Next, an aqueous solution having the following composition was applied onto the first layer and dried to thereby form a diazo layer (a second layer) having a solid adhesion amount of about 1.0 g/m$^2$:

| | |
|---|---|
| 4-diazo-2,5-dibutoxyphenylmorpholine chloride | 2 g |
| Tartaric acid | 0.5 g |
| Guanidine sulfate | 10 g |
| Water | 100 ml |

Thus, there was obtained a multi-layer type heat sensitive recording layer and a thermo-developable diazo copying material (Sample A) was prepared.

For comparison's sake, there was prepared a thermo-developable type diazo copying material (Sample B) by repeating the same procedure as aforesaid except that the 2-hydroxynaphthoic acid octadecylamide contained in the coupler layer was replaced by 2-hydroxynaphthoic acid morpholinopropylamide.

Next, an original was placed on each of the above samples. The same was exposed to ultraviolet ray radiation and successively heated at 95° C. for 3 seconds by means of an infrared heater, thereby obtaining a blue image. Its image density was measured. In order to test the raw preservability of each sample, furthermore, it was left standing for 24 hours in a desicator (50° C., 50% RH) for forced deterioration. Thereafter, each sample was taken out of the desicator and further subjected to overall radiation by means of a fluorescent lamp to decompose the diazo compound present in the recording layer completely. Then, the background density of each sample was measured, and was compared with that of each sample treated likewise except that the forced deterioration was omitted. The image density and the background density were evaluated by means of a Macbeth densitometer. The obtained results were as shown in Table-1.

TABLE 1

| Sample | Image density (95° C. - 3 seconds) | Raw preservability (50° C. - 50% RH, 24 hours) Background density before forced deterioration | Raw preservability (50° C. - 50% RH, 24 hours) Background density after forced deterioration |
|---|---|---|---|
| A (Our material) | 1.10 | 0.11 | 0.24 |
| B (Control) | 1.00 | 0.14 | 0.35 |

Items of test

EXAMPLE 2

| | |
|---|---|
| 4-diazo-1-toluylmercapto-2,5-diethoxybenzene-tetrafluoroborate | 2.0 g |
| Polyvinylidene chloride (50% emulsion) | 10 g |
| Behenic acid amide | 10 g |
| Water | 100 ml |

A mixture having the above composition was dispersed by means of a homogenizer. The resulting dispersion was applied onto the surface of a diazo copying base paper (a substrate) by means of a wire bar and dried to form a diazo layer (a first layer) having a solid adhesion amount of about 2.5 g/m$^2$. Next, a dispersion having the following composition:

| | |
|---|---|
| 6-methyl-2-hydroxynaphthoic acid octadecylamide | 3 g |
| Hydroxyethyl cellulose (5% aqueous solution) | 15 g |
| Urea | 5 g |
| Silica fine particles | 3 g |
| Water | 100 ml |

was applied onto the first layer by means of a wire bar and dried to form a coupler layer (a second layer) having a solid adhesion amount of about 3.5 g/m$^2$, thereby obtaining a multilayer type heat sensitive recording layer. Thus, there was prepared a thermo-developable type diazo copying material (Sample C).

Next, an original was placed on the thus obtained thermo-developable type diazo copying material (Sample C). The same was exposed to ultraviolet ray radiation and thereafter heated instantly by means of a xenon flash lamp to thereby form a high density blue image. The raw preservability of this material was confirmed to be superior to the same degree as that of Sample A.

EXAMPLE 3

| | |
|---|---|
| 2-hydroxy-3-dodecylcarbamoylnaphthalene | 3 g |
| Stearic acid anilide | 6 g |
| Vinyl chloride-vinyl acetate copolymer | 6 g |
| Methyl ethyl ketone | 100 ml |

A mixture having the above composition was dispersed by means of a homogenizer. The resulting dispersion was applied onto the surface of a diazo copying base paper (a substrate) by means of a wire bar and dried to form a coupler layer (a first layer) having a solid adhesion amount of about 5 g/m$^2$. Next, a mixture having the following composition was dispersed by means of a homogenizer:

| | |
|---|---|
| 4-diazo-2,5-diethoxyphenyl-N,N—dimethylaniline | 2 g |

-continued

| | |
|---|---|
| chloride.½$ZnCl_2$ | |
| Polyvinyl alcohol (10% aqueous solution) | 5 g |
| Behenic acid anilide | 20 g |

The resulting dispersion was applied onto the first layer by means of a wire bar and dried to form a diazo layer (a second layer) having a solid adhesion amount of about 3 g/m$^2$, thereby obtaining a multi-layer type heat sensitive recording layer. Thus, there was prepared a thermo-developable type diazo copying material (Sample D).

Next, an original was placed on the thus obtained thermo-developable type diazo copying material (Sample D). The same was exposed to ultraviolet ray radiation and thereafter heated at 100° C. for 5 seconds by means of a infrared heater, thereby forming a high density blue image. The raw preservability of this material was confirmed to be superior to the same degree as that of Sample A.

Further, this diazo copying material (Sample D) was brought into contact with a recorder equipped with a heat pen heated to 110° C. for recording purpose. Immediately after the contact, there was formed a high density blue image against a yellow background. In succession, the same was subjected to overall radiation of light from a fluorescent lamp for 3 seconds. As the result of this, the yellow background was turned white and thus fixation was completed.

We claim:

1. A thermo-developable diazo copying material comprising a substrate and a heat-sensitive recording layer superposed on said substrate, said heat-sensitive recording layer consisting essentially of an amount of a light-sensitive diazonium compound effective for producing a colored image on said material, an amount of a coupler effective to react with said diazonium compound to produce said colored image and a heat-fusible color assistant which is insoluble or slightly soluble in water and has a melting point in the range of 50° C. to 150° C., said color assistant being present in an amount in the range of from 0.1 to 100 parts by weight per 1 part by weight of said diazonium compound, said recording layer being a pair of superposed sublayers, one of said sublayers containing said diazonium compound and the other of said sublayers containing said coupler, and said color assistant being present in admixture with at least one of said diazonium compound or said color assistant in at least one of said sublayers, said coupler comprising at least one compound of the formula:

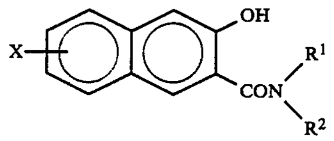

wherein X is hydrogen, halogen, alkyl having 1 to 4 carbon atoms or alkoxy having 1 to 4 carbon atoms, $R^1$ is alkyl having 10 to 25 carbon atoms, and $R^2$ is hydrogen or alkyl having 1 to 30 carbon atoms.

2. A copying material according to claim 1 wherein the solubility of said color assistant in water at 20° C. is 5% by weight or less.

3. A copying material according to claim 1 wherein said color assistant is a fatty acid amide having the general formula:

$R^3CONH_2$ wherein $R^3$ is a saturated or unsaturated aliphatic hydrocarbon group having 5–24 carbon atoms; an N-substituted fatty acid amide having the general formula:

$R^4CONHR^5$ or $R^6NHCOR^7$ wherein $R^4$ and $R^6$ are each a saturated or unsaturated aliphatic hydrocarbon group having 5–24 carbon atoms, and $R^5$ and $R^7$ are each an alkyl group having 1–5 carbon atoms, a substituted or unsubstituted phenyl group or a substituted or unsubstituted cyclohexyl group; or a benzamide derivative having the general formula:

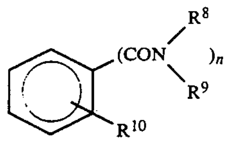

wherein $R^8$ and $R^9$ are each a hydrogen atom or an alkyl group having 1–5 carbon atoms, $R^{10}$ is a hydrogen atom or an alkyl or alkenyl group having 1–5 carbon atoms, and n is 1 or 2).

4. A copying material according to claim 1 wherein said color assistant is in the form of fine particles having a particle diameter of 0.1–10μ.

5. A copying material according to claim 1, wherein the content of said color assistant is from 1 to 50 parts by weight per 1 part by weight of the diazonium compound.

6. A copying material according to claim 1, wherein the weight ratio of the diazonium compound to the coupler is in the range of 1:0.5–20.

7. A copying material according to claim 1, wherein said diazonium compound is selected from the group consisting of 4-diazo-1-dimethylaminobenzene, 4-diazo-1-diethylaminobenzene, 4-diazo-1-dipropylaminobenzene, 4-diazo-1-methylbenzylaminobenzene, 4-diazo-1-dibenzylaminobenzene, 4-diazo-1-ethylhydroxyethylaminobenzene, 4-diazo-1-diethylamino-3-methoxybenzene, 4-diazo-1-dimethylamino-2-methylbenzene, 4-diazo-1-benzoylamino-2,5-diethoxybenzene, 4-diazo-1-morpholinobenzene, 4-diazo-1-morpholino-2,5-diethoxybenzene, 4-diazo-1-morpholino-2,5-dibutoxybenzene, 4-diazo-1-anilinobenzene, 4-diazo-1-dimethylamino-3-carboxybenzene, 4-diazo-1-toluylmercapto-2,5-diethoxybenzene, 4-diazo-1,4-methoxybenzoylamino-2,5-diethoxybenzene, and strong acid salts thereof.

8. A copying material according to claim 7, wherein said coupler is selected from the group consisting of 2-hydroxynaphthoic acid decylamide, 2-hydroxynaphthoic acid dodecylamide, 2-hydroxynapthoic acid octadecylamide, 2-hydroxynaphthoic acid heptadecylamide, 2-hydroxynaphthoic acid didodecylamide, 6-bromo-2-hydroxynaphthoic acid octadecylamide, 6-methyl-2-hydroxynaphthoic acid decylamide, 6-ethyl-2-hydroxynaphthoic acid dodecylamide, and 6-methoxy-2-hydroxynaphthoic acid octadecylamide.

9. A copying material according to claim 1, wherein said recording layer further comprises an effective amount of a binder present in admixture with at least one of said diazonium compound or said color assistant in at least one of said sublayers.

10. A copying material according to claim 9, wherein said binder is selected from the group consisting of starch, casein, polyvinyl acetate, polyvinyl alcohol, and polyacrylic acid derivatives.

11. A copying material according to claim 10, wherein said recording layer contains an effective amount of at lest one additive selected from the group consisting of thermal alkali generating substances, preservability improvers, antioxidants, solubilizers, acid stabilizers, and image density improvers in the form of fine inorganic or organic particles.

12. A copying material according to claim 1, wherein X is alkyl having 1 to 4 carbon atoms.

13. A copying material according to claim 1, wherein X is halogen.

14. A copying material according to claim 1, wherein X is alkoxy having 1–4 carbon atoms.

15. A thermo-developable diazo copying material comprising a substrate and a heat-sensitive recording layer superposed on said substrate, said heat-sensitive recording layer consisting essentially of a light-sensitive diazonium compound in an amount effective to produce a colored image on said material, a coupler in an amount of from 0.5 to 20 parts by weight of said coupler per 1 part by weight of said diazonium compound, a heat-fusible color assistant which has a solubility in water of 5 wt.% or less at 20° C. and has a melting point in the range of 50° C. to 150° C., in an amount of from 0.1 to 100 parts by weight per 1 part by weight of said diazonium compound, said color assistant being in the form of fine particles having diameters in the range of 0.1 to 10.0μ, and an effective amount of a binder, and said recording layer being a pair of sublayers, one sublayer being superposed on top of the other sublayer, each sublayer having a solid content in the range of 0.2 to 15 $g/m^2$, one of said sublayers containing said diazonium compound, and the other of said sublayers containing said coupler, and said color assistant and said binder are each present in admixture with at least one of said diazonium compound and said coupler in at least one of said sublayers, said coupler comprising at least one compound of the formula:

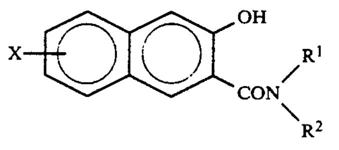

wherein X is hydrogen, halogen, alkyl having 1 to 4 carbon atoms or alkoxy having 1 to 4 carbon atoms, $R^1$ is alkyl having 10 to 25 carbon atoms, and $R^2$ is hydrogen or alkyl having 1 to 30 carbon atoms, and said color assistant is selected from the group consisting of:

(1) fatty acid amides having the formula $R^3CONH_2$, wherein $R^3$ is a saturated or unsaturated aliphatic hydrocarbon group having 5 to 24 carbon atoms;

(2) N-substituted fatty acid amides having the general formula $R^4CONHR^5$ or $R^6NHCOR^7$, wherein $R^4$ and $R^6$ are each a saturated or unsaturated aliphatic hydrocarbon group having 5 to 24 carbon atoms, and $R^5$ and $R^7$ are each alkyl having 1 to 5 carbon atoms, substituted or unsubstituted phenyl, or substituted or unsubstituted cyclohexyl; and (3) benzamide derivatives of the formula:

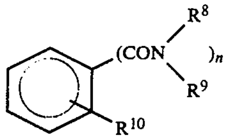

wherein $R^8$ and $R^9$ are each hydrogen or alkyl having 1 to 5 carbon atoms, $R^{10}$ is hydrogen or an alkyl or alkenyl group having 1 to 5 carbon atoms, and n is 1 or 2.

16. A copying material according to claim 15, wherein said diazonium compound is selected from the group consisting of 4-diazo-1-dimethylaminobenzene, 4-diazo-1-diethylaminobenzene, 4-diazo-1-dipropylaminobenzene, 4-diazo-1-methylbenzylaminobenzene, 4-diazo-1-dibenzylaminobenzene, 4-diazo-1-ethylhydroxyethylaminobenzene, 4-diazo-1-diethylamino-3-methoxybenzene, 4-diazo-1-dimethylamino-2-methylbenzene, 4-diazo-1-benzoylamino-2,5-diethoxybenzene, 4-diazo-1-morpholinobenzene, 4-diazo-1-morpholino-2,5-diethoxybenzene, 4-diazo-1-morpholino-2,5-dibutoxybenzene, 4-diazo-1-anilinobenzene, 4-diazo-1-dimethylamino-3-carboxybenzene, 4-diazo-1-toluylmercapto-2,5-diethoxybenzene, 4-diazo-1,4-methoxybenzoylamino-2,5-diethoxybenzene, and strong acid salts thereof.

17. A copying material according to claim 15, wherein said color assistant is one of said fatty acid amides (1).

18. A copying material according to claim 15, wherein said color assistant is one of said N-substituted fatty acid amides (2).

19. A copying material according to claim 15, wherein said color assistant is one of said benzamide derivatives (3).

* * * * *